United States Patent Office 3,409,635
Patented Nov. 5, 1968

3,409,635
PROCESS FOR THE PREPARATION OF CYCLIC SULFUR COMPOUNDS
Peter L. De Benneville, Philadelphia, and Lawrence J. Exner, Cheltenham, Pa., assignors to Rohm & Haas Company, Philadelphia, Pa., a corporation of Delaware
No Drawing. Filed June 27, 1963, Ser. No. 290,954
8 Claims. (Cl. 260—327)

This invention deals with a process for the preparation of cyclic sulfur compounds. It more particularly deals with a method for preparing cyclic xanthates. It also deals with a method for the preparation of epithioalkanes.

The process of the present invention is conducted by reacting carbon disulfide with a compound having the formula

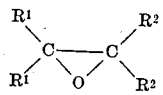

The reaction is conducted at a temperature range of about 0° to about 50° C. in the presence of a basic catalyst. Lower temperatures can possibly be used but the reaction rate tends to be relatively slow. From this reaction, there is produced a compound having the formula

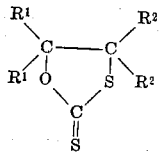

The basic catalyst employed must be sodium or potassium alkoxide, in which the alkyl portion contains from 1 to 8 carbon atoms, or sodium or potassium alkyl xanthates, in which the alkyl portion contains from 1 to 8 carbon atoms. Typical basic catalysts include sodium methoxide, sodium t-butoxide, sodium octoxide, potassium ethoxide, potassium isopropoxide, potassium isobutoxide, potassium hexoxide, sodium methyl xanthate, sodium ethyl xanthate, potassium ethyl xanthate, sodium butyl xanthate, potassium hexyl xanthate and sodium octyl xanthate. The preferred catalysts are sodium methoxide and sodium ethoxide. Strict adherence to the identity of the catalyst is necessary in order to achieve the objects of this invention.

In the above formulas, $R^1$ and $R^2$ represent hydrogen or methyl with the proviso that in any one compound, both of the $R^1$ embodiments or both of the $R^2$ embodiments must be hydrogen. Therefore, in any one compound, at least two of the total of four $R^1$ and $R^2$ embodiments are hydrogen.

If it is desired to prepare an epithioalkane, one heats the cyclic xanthate in the temperature range of about 70° to 150° C., preferably 100° to 130° C., in the presence of a basic catalyst. Necessary as catalysts for this stage of the process are those that have been set forth previously, and also sodium or potassium carbonate. Usually, the same catalyst that is used for the first stage is employed for the second stage. It is hereby possible to go from an oxirane to a thiirane in yields that range up to 75% and better and with good reproducibility of results.

For reasons of convenience, it is preferred to add the oxirane to a mixture of carbon disulfide and catalyst, but this is not critical. The second stage of the process is carried out by raising the temperature to the defined range, or it may be preferred to introduce the cyclic xanthate to a reaction vessel at a temperature in the range stated heretofore. At the conclusion of the reaction, it is preferred to remove rather promptly the thiirane product since there is a tendency towards polymerization in the presence of the catalyst employed at the temperatures used. Various other aspects of the present invention will be apparent hereinafter. The cyclic xanthate and thiirane products are hereby provided for application in many known uses. For example, cyclic xanthates may be used as fungicides, and the epithiiranes yield polymers which aid in the vulcanization of rubber.

The process of the present invention may be more fully understood from the following examples which are offered by way of illustration and not by way of limitation. Parts by weight are used throughout.

Example 1

To 380 parts of carbon disulfide in a large flask, fitted with stirrer, thermometer, addition funnel and a condenser filled with Dry Ice, are added 6.25 parts of sodium methoxide. To the mixture are then added dropwise 290 parts of propylene oxide, over a period of twenty minutes. The reaction takes place slowly with a gentle evolution of heat, over a period of about five hours. Temperature is controlled by heating and cooling as necessary between 30° and 50° C. After the exotherm is complete, the reaction mixture is allowed to stand overnight.

The product, propylene xanthate, consists mainly of the compound having the structure A, although some material of structure B is present.

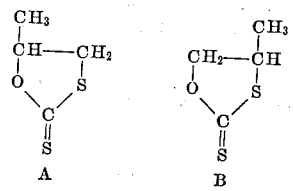

It is distilled directly through a short condenser, to give pure proylene xanthate as a colorless liquid having a boiling range of 96° to 103° C. at 0.3 mm. of mercury and an $n_D^{25}$ of 1.6219. The product contains 47.5% sulfur (theoretical 47.7%).

The crude product is converted directly to propylene sulfide by heating at 100° C. When the initial reaction is completed, the flask is arranged for distillation through a short column containing one to two inches of Cannon packing and the off-gases are led to two large traps immersed in a mixture of acetone and Dry Ice. Vacuum is placed on the apparatus to maintain a pressure of 100 mm. of mercury throughout the heating period. The pot temperature is raised to 110° to 120° C. The reaction takes place smoothly with some foaming at a temperature of 114° to 128° C. and a mixture of propylene sulfide and carbon oxysulfide is obtained in the traps. After no more gas is evolved, the trap contents are combined and allowed to warm to room temperature, to remove some of the dissolved carbon oxysulfide. The remaining liquid, 308 parts, is distilled through a short Cannon-packed column at atmospheric pressure, using a water condenser, to give 275 parts of propylene sulfide, boiling at 70° to 75° C.

Similar results are obtained if, for sodium methoxide, the following materials are substituted: sodium ethoxide, potassium t-butoxide, potassium isopropoxide, potassium methyl xanthate and potassium octoxide.

Example 2

A mixture is made of 300 parts of carbon disulfide and 5 parts of sodium methoxide, in a large flask fitted with stirrer, thermometer, a condenser filled with Dry Ice, and an inlet tube for ethylene oxide vapor. From an auxiliary flask, there are introduced by vaporization 141 parts of ethylene oxide. A small exotherm to about 35° C. is obtained. At the end of the addition of ethylene oxide, the mixture is heated at 45° C. for two hours. It is allowed to stand overnight. The flask is fitted as before with a short Cannon-packed column and an outlet to two traps immersed in Dry Ice-acetone mixture. Vacuum is applied to maintain a pressure of 200 mm. of mercury and the reaction is consummated by heating from 115° to 140° C. The trap contents are allowed to warm to room temperature and distilled at atmospheric pressure through a short Cannon-packed column, to yield ethylene sulfide, boiling at 51° to 55° C.

The intermediate cyclic xanthate can be distilled if the catalyst is first removed by dissolving the mixture in benzene and filtering. Upon distillation of the benzene solution under good vacuum, ethylene xanthate is isolated, as a light yellow liquid, boiling at about 100° C. at 0.4 mm. of mercury. It contains 53.9% sulfur (theoretical 53.4%).

Example 3

A mixture is made of 304 parts of carbon disulfide and 5 parts of sodium methoxide. To it are added, over a thirty-minute period at 26° to 44° C., 288 parts of isobutylene oxide. The mixture is heated under gentle reflux for six hours at 44° to 49° C. An additional 5 parts of sodium methoxide are added and the reaction is heated to 50° C. for an additional five hours. The reaction mixture is taken up in benzene and filtered to remove the catalyst. The benzene layer is washed to remove base, dried and stripped to yield 526 parts of a yellow oil.

The yellow oil analyzes correctly for isobutylene xanthate, having the structure:

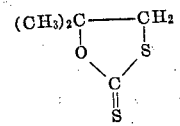

The oil is distilled at 90° to 94° C. at 0.6 mm. of mercury to give a colorless liquid containing 42.1% sulfur (theoretical 43.2%).

To the yellow oil are added 5 parts of sodium methoxide. The mixture is heated at 100° to 150° C. at a pressure of 70 mm. of mercury. The resulting isobutylene sulfide and carbon oxysulfide are collected in traps surrounded by Dry Ice-acetone mixture. The material in the traps is distilled at atmospheric pressure through a short Cannon-packed column to yield 55 parts of isobutylene sulfide, boiling at 85° to 87° C.

We claim:
1. A process for the preparation of cyclic sulfur compounds, which comprises reacting in the temperature range of about 0° to 50° C. carbon disulfide with a compound having the formula

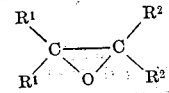

wherein $R^1$ and $R^2$ represent members from the class consisting of hydrogen and methyl, with the proviso that, in any one compound, both of the $R^1$ embodiments or both of the $R^2$ embodiments must be hydrogen, in the presence of a basic catalyst from the class consisting of sodium and potassium alkoxide, in which the alkyl portion contains from 1 to 8 carbon atoms, and sodium and potassium alkyl xanthate, in which the alkyl portion contains from 1 to 8 carbon atoms.

2. The process according to claim 1, wherein the reaction is conducted in the temperature range of about 0° to 50° C. to form a cyclic xanthate, which is heated in the temperature range of about 70° to 150° C. to form an epithioalkane.

3. The method according to claim 1, wherein the second stage of the reaction is conducted in the temperature range of about 100° to 130° C.

4. The method according to claim 1, wherein the catalyst employed is sodium methoxide.

5. The method according to claim 1, wherein the catalyst employed is sodium ethoxide.

6. A method for the preparation of ethylene sulfide, which comprises reacting carbon disulfide with ethylene oxide in the presence of sodium methoxide at a temperature range of about 0° to 50° C. to form ethylene xanthate, and then heating said ethylene xanthate in the temperature range of about 100° to 130° C. to form said ethylene sulfide.

7. A method for the preparation of propylene sulfide, which comprises reacting carbon disulfide with propylene oxide in the presence of sodium methoxide at a temperature range of about 0° to 50° C. to form propylene xanthate, and then heating said propylene xanthate in the temperature range of about 100° to 130° C. to form said propylene sulfide.

8. A method for the preparation of isobutylene sulfide, which comprises reacting carbon disulfide with isobutylene oxide in the presence of sodium methoxide at a temperature range of about 0° to 50° C. to form isobutylene xanthate, and then heating said isobutylene xanthate in the temperature range of about 100° to 130° C. to form said isobutylene sulfide.

References Cited

UNITED STATES PATENTS

| | | | |
|---|---|---|---|
| 3,071,593 | 1/1963 | Warner | 260—327 |
| 2,193,415 | 3/1940 | Coltof | 260—327 |
| 2,828,318 | 3/1958 | Reynolds | 260—327 |
| 3,073,846 | 1/1963 | Millikan | 260—327 |
| 3,282,960 | 11/1962 | Broderick et al. | 260—327 |

JAMES A. PATTEN, *Primary Examiner.*